US011928946B2

(12) United States Patent
Ferguson

(10) Patent No.: US 11,928,946 B2
(45) Date of Patent: Mar. 12, 2024

(54) EMERGENCY RING

(71) Applicant: Tyrone Ferguson, Saint James, NY (US)

(72) Inventor: Tyrone Ferguson, Saint James, NY (US)

( * ) Notice: Subject to any disclaimer, the term of this patent is extended or adjusted under 35 U.S.C. 154(b) by 25 days.

(21) Appl. No.: 17/728,033

(22) Filed: Apr. 25, 2022

(65) Prior Publication Data

US 2023/0343199 A1 Oct. 26, 2023

(51) Int. Cl.
*G08B 21/02* (2006.01)
*G08B 21/04* (2006.01)

(52) U.S. Cl.
CPC ..... *G08B 21/0269* (2013.01); *G08B 21/0208* (2013.01); *G08B 21/0219* (2013.01); *G08B 21/0288* (2013.01); *G08B 21/0492* (2013.01)

(58) Field of Classification Search
CPC .................................................. G08B 21/0269
See application file for complete search history.

(56) References Cited

U.S. PATENT DOCUMENTS

2009/0163824 A1* 6/2009 Ide ..................... A61B 5/02233 600/499
2013/0182382 A1* 7/2013 Vardi ................. G08B 21/0492 361/679.01
2018/0307326 A1* 10/2018 Hoggeg ..................... G06F 1/16
2020/0259944 A1* 8/2020 Hoggeg .................. H04W 4/12
2021/0278561 A1* 9/2021 Mehra .................... A61B 5/681

* cited by examiner

*Primary Examiner* — Travis R Hunnings
(74) *Attorney, Agent, or Firm* — Lyman Moulton, Esq.; Moulton Patents, PLLC

(57) ABSTRACT

The keep safe ring is the only product of its kind that incorporates advanced technologies such as pressure sensors and perimeter reading settings to provide maximum protection for its users. The keep safe rings is uniquely designed with lightweight waterproof materials and can be paired with multiple cellular devices to increase accessibility and functionality. In addition to providing accurate GPS tracking, the keep safe ring is capable of checking vital signs via a special health sensor that measures blood pressure, heart rate, blood oxygen levels, and body temperature that can be viewed via the display screen that also shows the time, date and any upcoming appointments the user may have. Furthermore, strategic buttons that surround the ring include a panic button to be pressed three times consecutively to note when the wearer is in danger.

20 Claims, 5 Drawing Sheets

EMERGENCY RING

BACKGROUND

Tracking the location of an individual's loved one to ensure their safety can be an incredibly difficult process for some. Considering child abduction and kidnappings have become extremely prevalent in society, it is important parents are able to keep track of their child's movement to spot any irregular activity. Individuals with Alzheimer can also be at threat considering sporadic movement and incapability of tracing steps can lead to serious consequences. There have been no products available as original equipment or as an aftermarket to address this problem.

An apparatus to simply yet effectively keep track of your loved one, ensuring their safety especially for children, or individuals with Alzheimers is not being met by any known device or system at present. There have been no products available as original equipment or as an aftermarket to address this problem either.

SUMMARY OF THE INVENTION

The main purpose of the emergency ring is to give individuals the opportunity to accurately track and monitor the movement of their loved ones through a discrete ring that utilizes an advanced GPS system.

A ring comprising a security protocol circuit configured to accept a user's code to lock and to unlock security for the ring via a GPS (Global Positioning Satellite) link. A plurality of nubs an inner circumference of the ring are configured to constrict the ring onto a user's finger based on the security protocol.

A pressure sensor is configured to detect an unauthorized removal of the ring per the security protocol. The nubs are further configured to release from the user's finger into the ring based on the acceptance of the user's code by the security protocol circuit to allow a removal of the ring from the user's finger.

Figure 1:
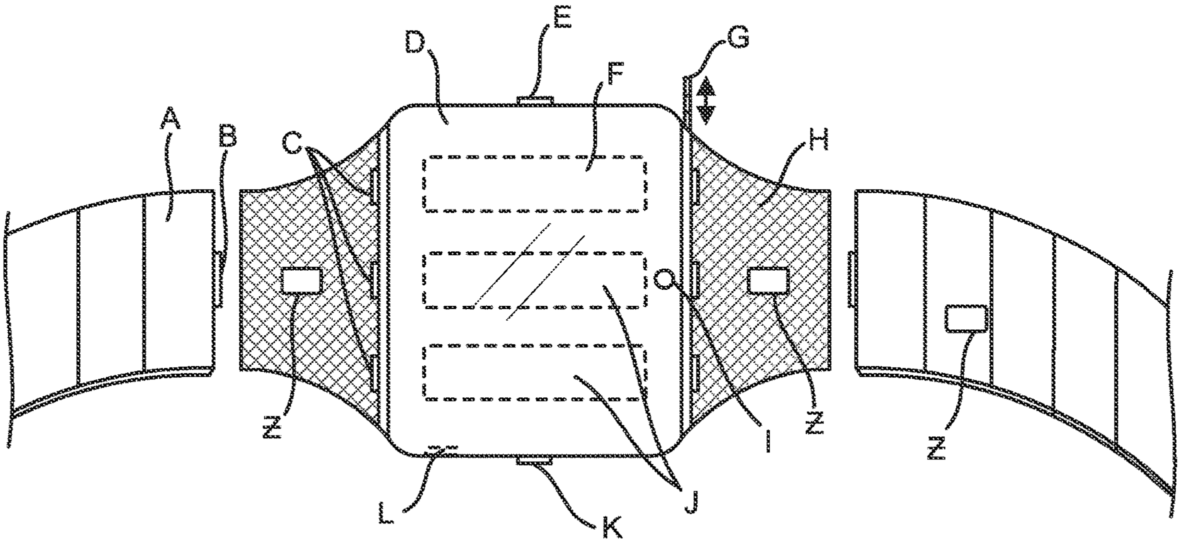
FIG. 1 is a front elevational view of the emergency ring in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

FIG. 1 is a front elevational view of the emergency ring showing: interchangeable resizable wrist band referenced as A, interlocking link referenced as B, hinges to open watch cover referenced as C, flexible watch screen referenced as D, panic button referenced as E, GPS referenced as F, antenna style stylus referenced as G, speaker referenced as H, video recorder referenced as I, sensors to detect vital signs referenced as J, on/off button referenced as K, USB charging port referenced as L, in accordance with an embodiment of the present disclosure. The view also includes security nubs Z on an inside circumference of the ring.

Figure 2:
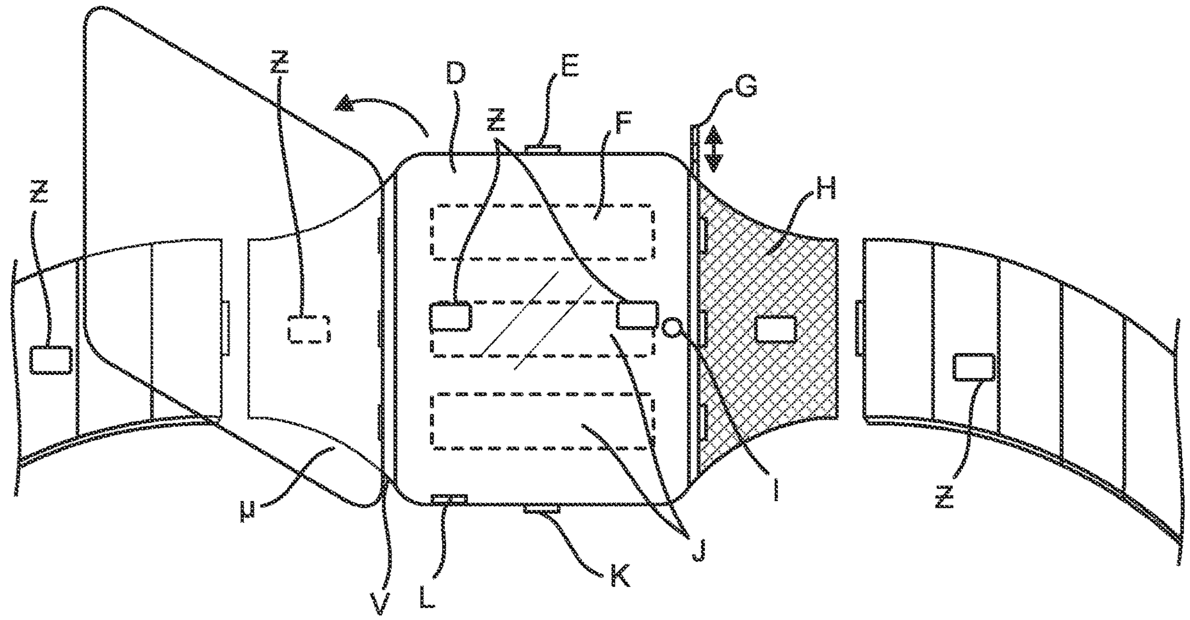
FIG. 2 is a front elevational view of the emergency ring in accordance with an embodiment of the present disclosure.

FIG. 2 is a front elevational view of the emergency ring showing: flexible watch screen referenced as D, panic button referenced as E, GPS referenced as F, antenna style stylus reference as G, speaker referenced as H, video recorder referenced as I, sensors to detect vital signs referenced as J, on/off button referenced as K, USB charging port referenced as L, in accordance with an embodiment of the present disclosure. The view also includes a cover U and a hinge V configured to adjoin the cover U and the emergency ring or wrist band. The view also includes a cover U connected to the ring by a hinge V. The nubs Z protrude from an inside circumference of the ring to make it harder to remove by an unauthorized person or force.

Figure 3:
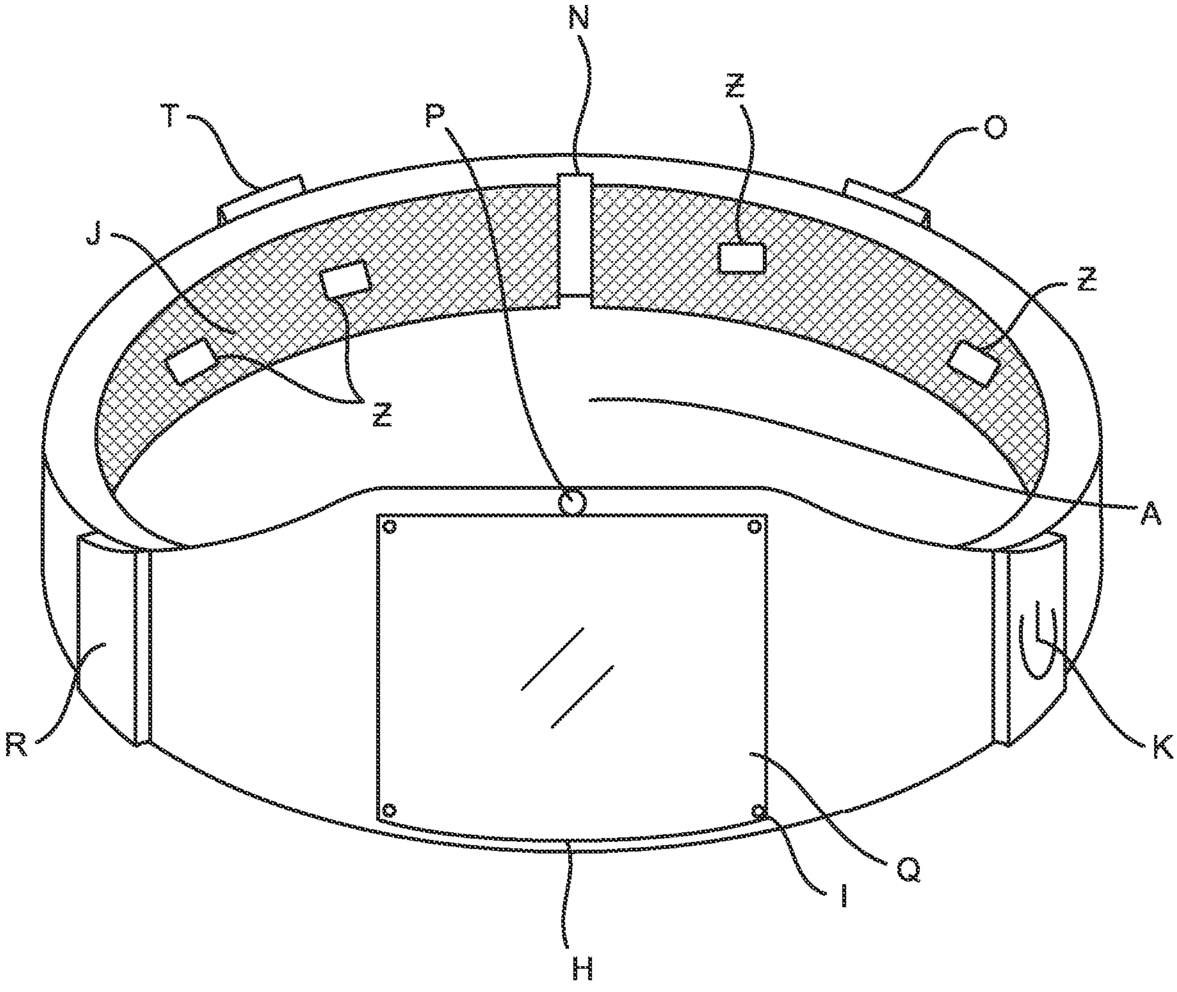
FIG. 3 is a front perspective view of the emergency ring in accordance with an embodiment of the present disclosure.

FIG. 3 is a front perspective view of the emergency ring showing: display screen referenced as IT, video recorder referenced as I, sensors to detect vital signs referenced as J, on/off button referenced as K, pressure sensor for unauthorized removal of the ring referenced as M, slot for interchangeable finger guard referenced as N, button for watch to display time, date & appointments referenced as O, microphone referenced as P, display screen referenced as Q, settings button referenced as R, in accordance with an embodiment of the present disclosure.

Figure 4:
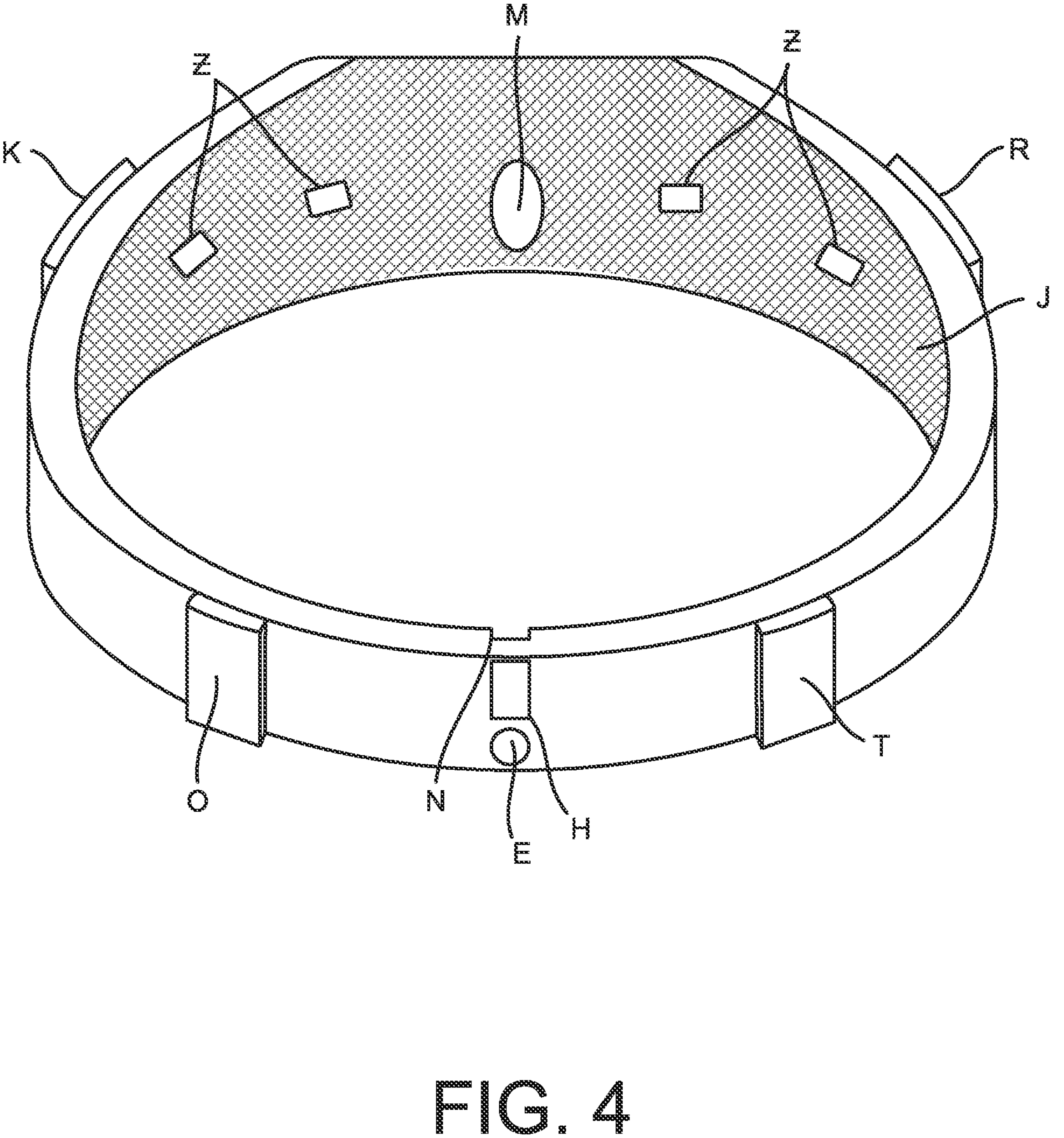
FIG. 4 is a back perspective view of the emergency ring in accordance with an embodiment of the present disclosure.

FIG. 4 is a back perspective view of the emergency ring showing: panic button referenced as E, speaker referenced as H, sensors to detect vital signs referenced as J, on/off button referenced as K, pressure sensor for unauthorized removal of the ring referenced as M, slot for interchangeable finger guard referenced as N, button for watch to display time, date & appointments referenced as O, settings button referenced as R, mode change button referenced as T, in accordance with an embodiment of the present disclosure. The nubs Z, also known as security nubs, respectively protrude and retract from and into the ring according to the security protocol circuits and acceptance of the user's code thereby.

Figure 5:
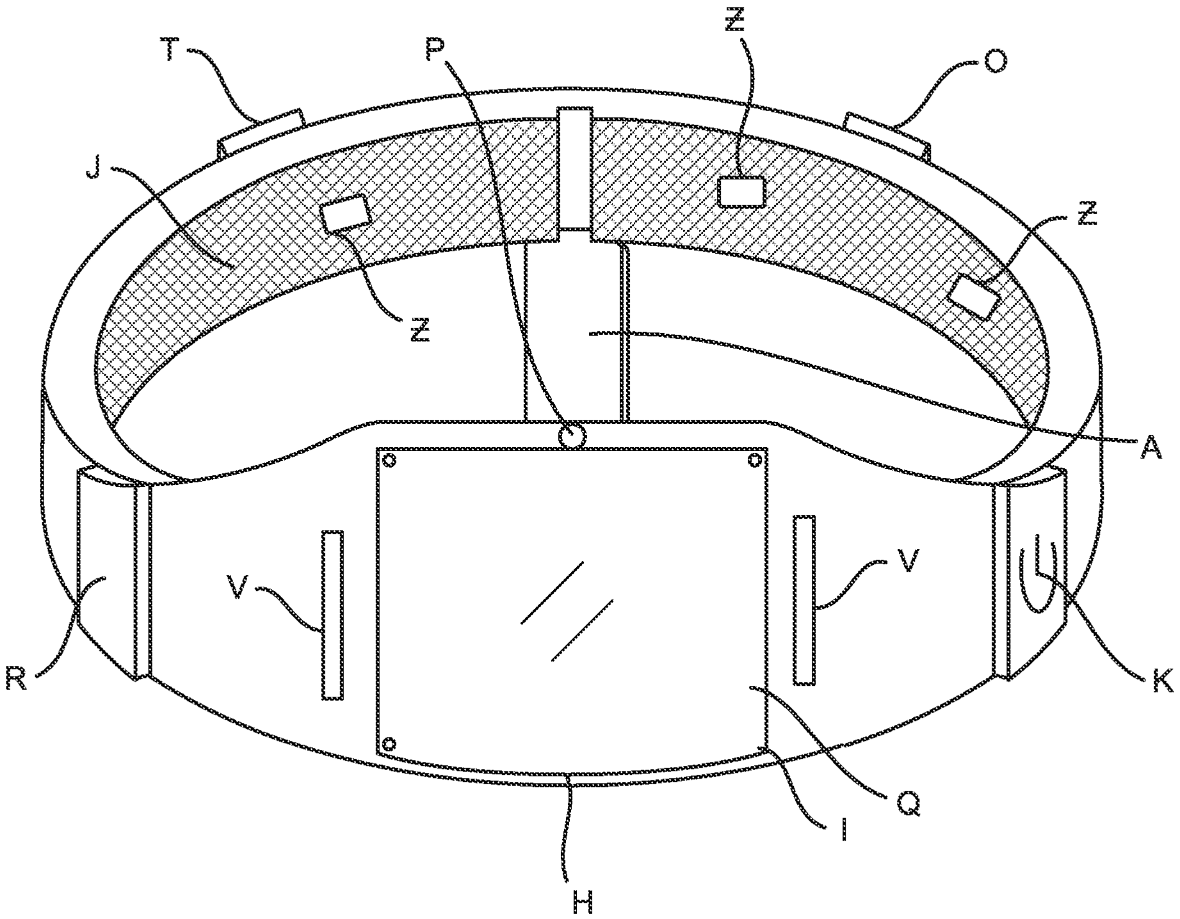
FIG. 5 is a front perspective view of the emergency ring in accordance with an embodiment of the present disclosure.

FIG. 5 is a front perspective view of the emergency ring showing: interchangeable resizable wrist band referenced as A, display screen referenced as H, video recorder referenced as I, sensors to detect vital signs referenced as J, on/off button referenced as K, button for watch to display time, date and appointments referenced as O, microphone referenced as P, display screen referenced as Q, settings button referenced as R, mode change button referenced as T, in accordance with an embodiment of the present disclosure. The security nubs Z are shown on a band portion of the ring but are also found on an underside of the face of the ring. A speaker V allows audible commands to the security protocol circuit internal to the ring and not depicted.

The present disclosed emergency ring, also known as the "Keep Safe Ring" offers a novel wearable ring that can monitor movement and can be tracked via a cellular device. Expanding on the initial design of the modern ring, the keep safe ring is tightly secured onto the user's finger and can only be unlocked via a customized code on the app that releases the locking mechanism. This necessary feature ensures the user is safe at all times. If the ring is forced off the finger by a dangerous third party figure, a pressure sensor sounds a loud alarm to alert the surrounding area that the individual is at risk. Furthermore, discrete microphone and camera functions enable the individual tracking the user to listen and watch any irregular activity, in the event, an individual has gone missing or experienced an incident. To prolong battery life, the display screen simultaneously works as a solar panel to ensure long term functionality. The keep safe ring ensures a fully operational safety ring intended to significantly decrease the likelihood of dangerous situations occurring to loved ones within public or private spaces.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. A ring comprising:

a security protocol circuit configured to accept a user's code to lock and to unlock security for the ring via a GPS (Global Positioning Satellite) link;

a plurality of nubs an inner circumference of the ring and configured to constrict the ring onto a user's finger based on the security protocol; and a pressure sensor configured to detect an unauthorized removal of the ring per the security protocol.

2. The ring of claim 1, further comprising a cover for a display screen on a face of the ring.

3. The ring of claim 1, further comprising a cover for a display screen on a face of the ring and a hinge to adjoin the cover and the display screen.

4. The ring of claim 1, wherein a display screen on a face of the ring further comprises embedded solar cells to enable simultaneous solar charging the ring circuits and display screen use.

5. The ring of claim 1, further comprising an interchangeable and resizable finger band.

6. The ring of claim 1, wherein a display screen on the ring is flexible.

7. The ring of claim 1, further comprising a stylus antennae for the ring.

8. The ring of claim 1, further comprising a video recorder in the ring.

9. The ring of claim 1, further comprising an on/off button on the ring.

10. The ring of claim 1, further comprising a USB (Universal Serial Bus) charging port on the ring.

11. The ring of claim 1, further comprising a button on the ring configured to activate a display time, date and appointments.

12. The ring of claim 1, further comprising a microphone and a speaker on the ring.

13. The ring of claim 1, further comprising a settings button and a mode change button on the ring.

14. The ring of claim 1, further comprising a slot in the band for interchanging fingers.

15. The ring of claim 1, further comprising a panic button on the ring.

16. The ring of claim 1, further comprising sensors on the ring to detect vital signs of a user of the ring.

17. The ring of claim 1, wherein the user's code is accepted by the ring audibly.

18. The ring of claim 1, wherein the user's code is accepted by the ring via a number of finger taps according to the security protocol circuit.

19. The ring of claim 1, wherein the plurality of nubs are further configured to release from the user's finger into the ring based on the acceptance of the user's code by the security protocol circuit to allow a removal of the ring from the user's finger.

20. The ring of claim 1, further comprising an alarm triggered by the security protocol circuit and transmitted by the ring to others associated with the user.

* * * * *